United States Patent [19]
Furse

[11] Patent Number: 4,571,735
[45] Date of Patent: Feb. 18, 1986

[54] METHOD OF MULTI-LEVEL ENCODING INCLUDING SYNCHRONIZING SIGNALS

[76] Inventor: Anthony G. Furse, 15 Centennial Ave., Lane Cove N.S.W. 2066, Australia

[21] Appl. No.: 503,367
[22] PCT Filed: Oct. 8, 1982
[86] PCT No.: PCT/AU82/00166
§ 371 Date: Jun. 7, 1983
§ 102(e) Date: Jun. 7, 1983
[87] PCT Pub. No.: WO83/01360
PCT Pub. Date: Apr. 14, 1983

[30] Foreign Application Priority Data
Oct. 8, 1981 [AU] Australia .................... PF1107

[51] Int. Cl.$^4$ ........................... H03K 13/24
[52] U.S. Cl. ........................... 375/20; 375/19; 371/56; 360/40; 340/347 DD
[58] Field of Search .................. 375/20, 17, 19, 114, 375/116, 117, 113, 111, 110; 371/56; 370/48; 360/40; 340/347 DD

[56] References Cited
U.S. PATENT DOCUMENTS

| | | | |
|---|---|---|---|
| 3,418,631 | 12/1968 | Sipress et al. .................. | 371/56 |
| 3,439,330 | 4/1969 | Sipress et al. .................. | 371/56 |
| 3,611,141 | 10/1971 | Waters .................... | 375/19 |
| 4,048,440 | 9/1977 | Peck et al. .................. | 375/117 |
| 4,103,234 | 7/1978 | Frazier, Jr. .................. | 375/20 |

OTHER PUBLICATIONS

Dorres, I. et al, "An Experimental 224 Mb/s Digital Repeatered Line", *The Bell System Technical Journal*, vol. 45, No. 7, Sep. 1966.

"A New Class of Selected Ternary Pulse Transmission Plans for Digital Transmission Lines", J. M. Sipress, IEEE Transactions on Communication Technology, vol. 13, No. 3, pp. 366-372, 9/66.

*Primary Examiner*—Robert L. Griffin
*Assistant Examiner*—Timothy K. Greer
*Attorney, Agent, or Firm*—Burns, Doane, Swecker & Mathis

[57] ABSTRACT

A method and apparatus for transmitting binary sequential data by the multi-level encoding of grouped selected data bits are disclosed. A first number of data bit sequences of the grouped data bits are translated into uniquely chosen ones of a first group of differing level pairs of a multi-level signal and the remaining data bit sequences of the grouped data bits are translated, in a first mode of translation, into uniquely chosen ones of a second group of differing level pairs of the signal, and, in a second mode of translation, into uniquely chosen ones of a third group of differing level pairs of the signal, the mode of translation changing after the occurrence of any of the remaining data bit sequences. The transmission of the signal level pairs representing data is preceded by the transmission of a start synchronizing signal comprising first pair of levels of the signal not contained in the first, second or third groups and is followed by a second pair of levels of the signal not contained in the first, second or third groups.

25 Claims, 16 Drawing Figures

METHOD OF MULTI-LEVEL ENCODING INCLUDING SYNCHRONIZING SIGNALS

FIELD OF THE INVENTION

This invention relates to the transmission of binary digital information, and to techniques in the communication of binary digital data between operating entities such as computer processors and remote devices, or between a number of computers where each can obtain direct access to the memory space of another. As will appear below, the invention has many other fields of application, and involves novel aspects both in the communications protocol employed, and in the circuitry by which the system may efficiently be realised.

BACKGROUND ART

Prior art methods of binary digital transmission employed either synchronous or asynchronous transmission, without the ability to change between these modes due to the synchronising characters by which the former is structured, and the start and stop bits employed in the latter, framing each character transmitted for character synchronisation. The use of a unique synchronising character in synchronous data transmission limits the rate of data transmission, due to the requirement that transmitted characters be continuously checked and if necessary modified to preserve the uniqueness of the synchronising character.

DISCLOSURE OF THE INVENTION

The present invention seeks to overcome such disadvantages by employing a novel transmission protocol in a ternary or higher multi-level code, and using the noise-free characteristics of optical fibre links. The invention also provides a novel technique for driving the multi-level signal generator, which not only proivdes advantages in driver operation, but also simplifies the encoding circuitry required.

Using prior art techniques, the maximum transmission bit rate for a given optical fibre link length has been limited by modal and material dispersion. The noise-free properties of optical fibres makes it possible, however, to use ternary or higher multi-level codes to obtain increased data transmission rates for a given bit rate, by trading optical power loss for greater data throughput. When it is considered that a 1 km optical fibre link can achieve −18 dbm optical power at the receiver, and that data can be recovered up to −38 dbm, there is a 20 dbm excess available for the use of a multi-level code. The use of ternary code can give an effective data bit rate equal to the transmitted bit rate. Codes of more levels could be employed to allow the transmitted data bit rate to exceed the transmission bit rate by a factor of 2 or 3, to this end codes of up to 9 levels may be employed to utilise fully the 20 dbm excess previously mentioned.

By providing an approach to multi-level encoding and transmission protocols which simplifies the necessary componentry and achieves very high transmission rates, the present invention enables these properties of fibre optic links to be utilised in achieving very high speed, transparent, and reliable data transfer.

Multi-level encoding of groups of data bits (for example bit pairs) to corresponding voltage level pairs on a transmission line are known. In these techniques the excess states, unused for the encoding of the possible bit pair combinations are used to indicate bit pair synchronisation errors. In paired selected ternary encoding, three such "illegal" states exist. The use of these three illegal states for the purpose of indicating loss of bit pair synchronisation is wasteful, however, as the ability to restore synchronisation during transmission is unnecessary due to the fact that the loss of synchronisation having corrupted the data, the data must be retransmitted anyway. If only one of the three illegal states is used for pair synchronisation, errors will be identified within a few characters and the transaction aborted.

The invention broadly resides in a method for the transmission of binary sequential data by the multi-level encoding of grouped selected data bits in which a first number of data bit sequences of said grouped data bits are translated into uniquely chosen ones of a first group of differing level pairs of a multi-level signal and the remaining data bit sequences of said grouped data bits are translated, in a first mode of translation, into uniquely chosen ones of a second group of differing level pairs of said signal, and, in a second mode of translation, respectively into uniquely chosen ones of a third group of differing level pairs of said signal, the mode of translation changing after the occurrence of any of said remaining data bit sequences, characterised in that the transmission of said signal level pairs representing data is preceded by the transmission of a start synchronising signal comprising first pair of levels of said signal not contained in said first, second or third groups and is followed by a second pair of levels of said signal not contained in said first, second or third groups.

Preferably the synchronising signal pairs are those which do not involve a change of signal level, e.g. the pairs − − and + + in a ternary coded system as described below, or 11, −1−1 etc. in a higher level code. If then all signal pairs corresponding to valid data bit groups involve a level transition bit group synchronisation is easily established.

Preferably also a chosen one of the translation mode reversing bit groups is transmitted continuously during periods where no data is present, to enable bit group synchronisation to be maintained and the transmission line to be monitored.

While the present invention will be described herein in relation to the use of ternary encoding, it is equally applicable to higher level multi-level codes, particularly $(2n+1)$-ary codes, and this must be borne in mind in the ensuing description of the invention. Similarly, while the invention will be described in its application to the transmission of data bit pairs, it will be applicable to the transmission of data grouped in other ways.

In its application to ternary encoding, the preferred data encoding format used is that of paired selected ternary encoding, such a system having been described, for example, by sipress, "A New Class of Selected Ternary Pulse Transmission Plans for Digital Transmission Lines", IEEE Transactions on Communication Technology 13, 3, Sept. 1965, pp. 366–372.

In paired selected ternary (PST) encoding, bit pairs are encoded in a format such as the following:

| Binary | Mode A | Mode B |
| --- | --- | --- |
| 11 | +0 | 0− |
| 10 | +− | +− |
| 01 | −+ | −+ |
| 00 | 0+ | −0 | where the mode of translation is changed (A to B, B to A) immediately following each occurrence of either bit pair 11 or 00, these being the bit pairs for which the ternary translation changes according to the translation mode. The particular encoding format illustrated above is that of modified PST (MPST).

The ternary signal level pairs which do not represent a valid bit pair in MPST are the pairs ++, 00 and −−, that is the pairs involving no change of ternary signal level. In accordance with the present invention, two of these ternary level pairs are employed in the transmission protocol, respectively to indicate the beginning and end of a block of data, such as a byte of, for example 8 data bits in asynchronous transmission, or any sequence of characters in a synchronous transmission. In this way, the transmission protocol is completely transparent, in using unique synchronising bit pairs which do not overlap with possible data bit pairs, and is adaptable to either synchronous or asynchronous transmission or a mixture of both, this contributing significantly to the data transmission rates which can be achieved.

As applied to ternary encoding, the invention resides in a method for the transmission of binary sequential data by paired selected ternary encoding in which two of the possible four bit sequences of paired binary data are translated into uniquely chosen ones of two of the six possible successive differing level pairs of a ternary signal and the other two of the possible four bit sequences of the paired data are translated, in a first mode of translation, into respective uniquely chosen ones of a further two successive differing level pairs of said ternary signal, and, in a second mode of translation, respectively into the remaining two successive differing level pairs of said ternary signal, the mode of translation changing after an occurrence of either of the said other two bit sequences, characterised in that the transmission of said ternary signal representing a unit of data is preceded by the transmission of two bits comprising successive identical first levels of said ternary signal and followed by the transmission of two bits comprising successive identical second levels of said ternary signal.

Such a transmission system enables both pair synchronisation and character synchronisation to be maintained with very high transmission rates. As all ternary level pairs corresponding to a valid bit pair involve a level transition, correct bit pair synchronisation may be established by locating the series of transitions which will occur in the transmitted signal regularly at bit pair intervals, bit pair framing being established on either side of these transitions.

Similarly, incorrect bit pair synchronisation will be detected by the presence of the invalid ternary pair 00.

In a further development of the transmission system according to the invention, one or the other of translation mode reversing bit pairs 11 or 00 is transmitted continuously during periods where no data is present. By this means bit pair synchronisation may be maintained continuously, and transmission line faults or deterioration may also be continuously monitored. Furthermore since the average DC level of such a signal in this idling state is 0, the receiver data amplifier may be provided with automatic gain control, and AC coupling employed in the data recovery circuits.

The use of this idling signal to maintain bit pair synchronising information in the absence of data, and the fact that bit pair synchronisation information is continuously available during the transmission of data, enables very simple receiver clock circuitry to provide great stability and accuracy.

BRIEF DESCRIPTION OF THE DRAWINGS

Embodiments of the present invention are described below, by way of example only, with reference to the accompanying drawings, in which.

Figure 1A:
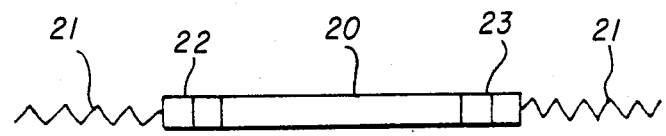
FIGS. 1A and 1B show transmission protocols employed in a preferred embodiment of the invention.
Figure 1B:
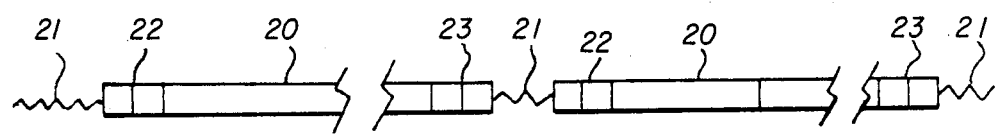

Illustrated in FIG. 1A and FIG. 1B respectively is the transmission protocol employed in the preferred embodiment of the invention, for hybrid use with a synchronous and asynchronous operation. Asynchronous operation is shown in FIG. 1A, an 8-bit character 20 being preceded by an idle signal 21 of variable duration and two bits 22 of character starting synch., which may consist of a pair of (+) ternary signal levels, and followed by two bits 23 of the character end synch. signal −−, whereupon the system returns to idle at 21.

Synchronous operation is shown in Fig. 1B, where similar components of the protocol have the same reference numerals, 20 representing a string of data bytes of any convenient or arbitrary length. Preferably, the minimum idle signal between data transmissions is two bits. A checksum or cyclic redundancy check for transmission errors may be provided by the user's transmission logic, although the use of fibre optics eliminates the need for such checks in suitable cases, as error rates will be as low as one in $10^9$ to $10^{12}$.

Figure 2:
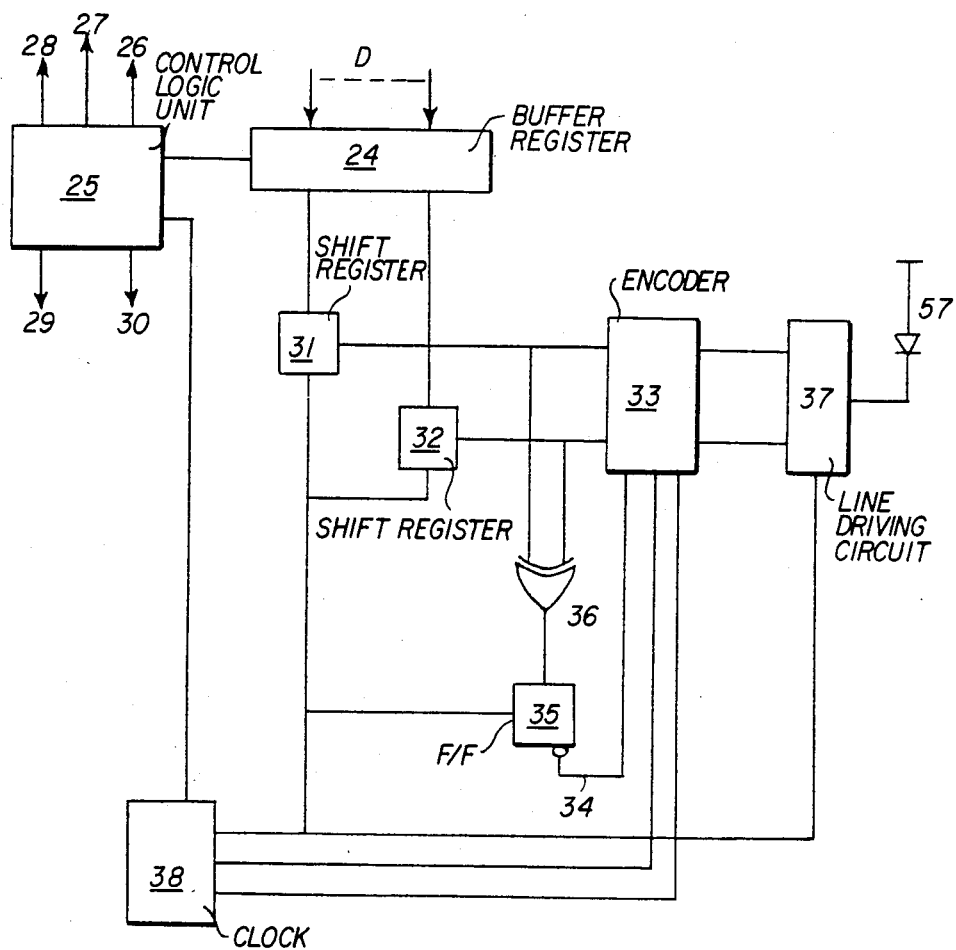
FIG. 2 is a schematic diagram of an encoding and transmitting arrangement embodying the invention.

Schematically illustrated in FIG. 2 is a data encoding and transmitting arrangement embodying the present invention. This unit accepts parallel data, encodes this for application to a fibre optic driver unit described below, and provides data control connection with the data source. 8-bit parallel data D is received by a data buffer register 24 under the control of a data control logic unit 25. The latter unit is provided with a data strobe input 26, data request output 27, and overrun output 28, the latter providing an overrun signal to the data source. This overrun state occurs when the sender does not keep up with requests for data on line 27. This may of course be deliberate in the case of asynchronous transmission. Overrun in the case of synchronous transmission terminates the current data block. In either case the occurrence of overrun causes the transmission of the end of block synchronising pair − −, after which the data in the shift registers 31 and 32 is zeros, and these are then employed to generate the idling pattern referred to above. It will be appreciated that transfer of the next data byte will cause a start of block signal + + to be sent in front of the data.

The logic unit 25 provides data synchronising signals designated SSYNCH and ESYNCH at respective outputs 29 and 30 to cause generation in the line driver circuitry, of the data start and end signals + + and − −, as described below.

8-bit parallel data is transferred from the register 24 to shift registers 31 and 32, which respectively receive data bits 1, 3, 5, 7 ($A_n$) and 2, 4, 6, 8 ($A_{n+1}$), so that the data will be presented in data bit pairs serially to the encoder 33. Due to the use of dual drivers in the line driver circuitry to be described below, the encoder 33 may comprise digital multiplexers instead of the ROM's or complex logic required in prior art techniques. This is an important advantage of this aspect of this present invention, as the substitution of digital multiplexers allows higher transmission speeds to be achieved.

Encoder 33 is provided with a translation mode-change input 34 controlled by a toggle flip-flop 35, which is in turn actuated by an exclusive OR gate 36 which operates to sense the mode-changing bit pairs 11, 00 at the outputs of shift registers 31, 32. The output signals of the ternary encoder are passed to the line driving circuitry 37 which controls an LED 57 or other light emitting device.

The shift registers 31 and 32, and the flip-flop 35 are controlled by clock pulses from a clock generator 38, which provides clock pulses also to the encoder 33 and the line driver circuitry.

Figure 3:
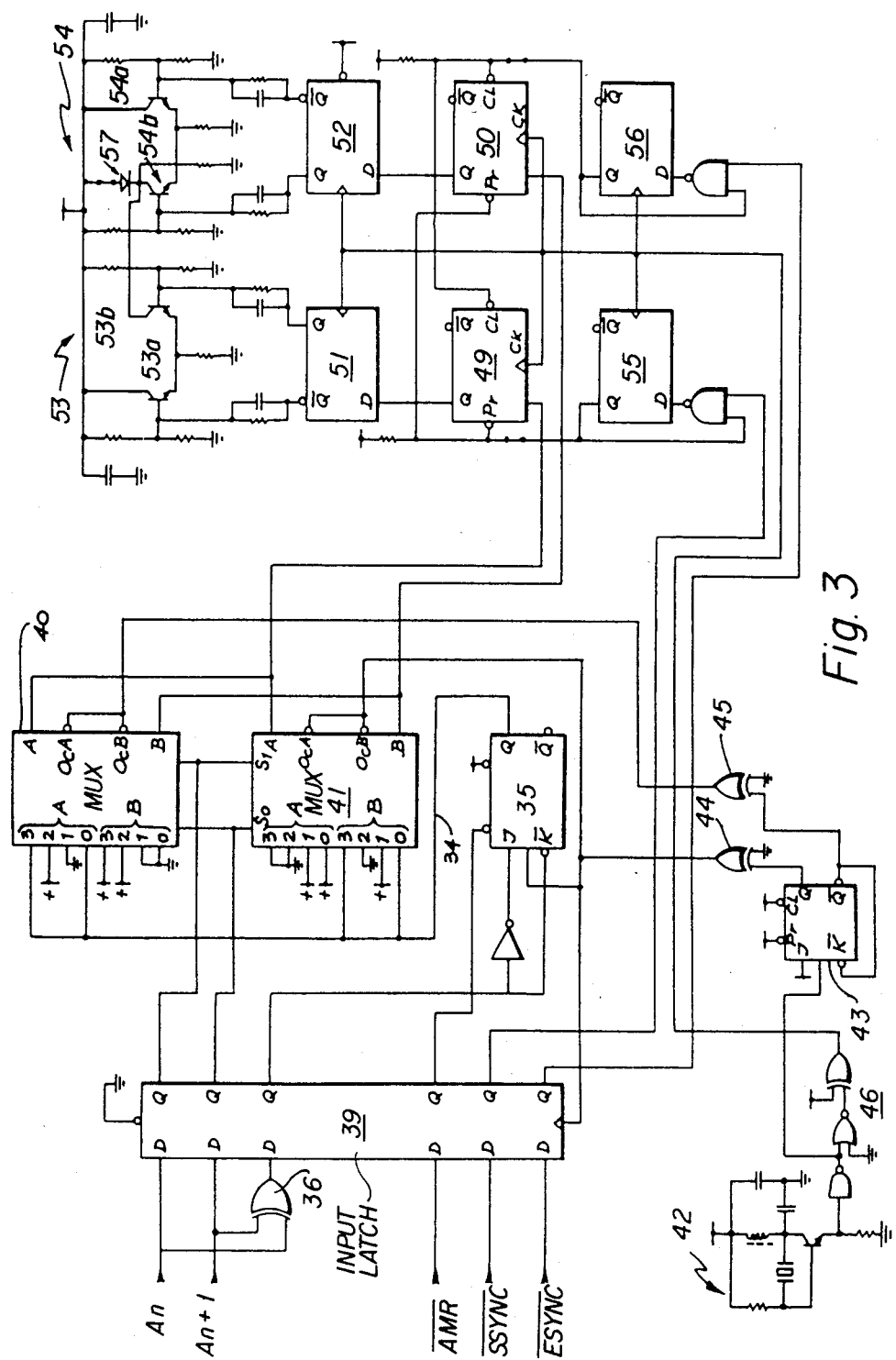
FIG. 3 shows the circuitry of the encoding and line driving portions of a data transmitter.

The ternary encoding and line driving circuitry is shown in some detail in FIG. 3. Odd and even data bits $A_n$ and $A_{n+1}$ from the shift registers 31 and 32, together with the SSYNCH and ESYNCH signals are applied to an input latch 39 and thence to a pair of digital multiplexers 40 and 41 which comprise the encoder 33. Provision is also made for an input signal AMR, which will reset the translation mode flip-flop to the A mode, should it be required in the chosen transmission protocol that transmission always commence in A mode.

Clock signals for the encoding and line driving circuitry are generated by a crystal oscillator 42, the output of which provides complementary clock signals from flip-flop 43 and respective buffer gates 44 and 45. Bit-rate clock signals are also provided from propagation delay equalising gates 46. The clock signal from gate 44 is applied to the input latch 39, the translation mode flip-flop or latch 35 and multiplexer 41, while multiplexer 40 is controlled by the complementary clock signal from the gate 45.

The dual four-input multiplexers 40 and 41 are controlled by the translation mode flip-flop 35 and by appropriate setting of their remaining controlling inputs, to provide at their interconnected A and B outputs, signals coded in relation to the input data correctly to control the dual-ended arrangement which drives the LED, described below.

The encoder output signals are applied respectively to flip-flops 49 and 50 which are clocked by the bit rate clock derived from the network 46. The Q output of each of these flip-flops 49 and 50 is applied to respective D type flip-flops 51 and 52.

Two complementary transistor pairs 53 and 54 are respectively driven by the outputs of the D flip-flops 51 and 52. Each of these identical transistor pairs is shown as comprising transistors 53a and 53b, 54a and 54b, and it will be observed that the light-emitting diode 57 carries the collector currents of both transistors 53b and 54b. The LED 38 will therefore produce a (−) level of the ternary output signal when both 53b and 54b are "off" (no current), a (+) level when both are "on" (full current) and a (0) level when either is on while the other is off (one-half of the available current). Thus in implementing the coding logic of the encoder 33, a choice may always be made between two alternative output modes to achieve a 0 ternary drive, and the two multiplexers 40 and 41 are readily encoded to provide the correct driving signals to the flip-flops 49 and 50.

In order to provide for the superimposition of the start and end synchronising signals, the signals SSYNCH and ESYNCH are transferred by input latch 39 respectively to D flip-flops 55 and 56. The start synch. flip-flop 55 is connected to the preset inputs of the flip-flops 49 and 50, while the end synch. flip-flop 56 is connected to the clear inputs of these flip-flops. In this way the respective synchronising signals + + and − − are imposed by over-riding the normal operation of the flip-flops 49 and 50.

The use of differentially driven transistor pairs for the control of the output LED current provides greater speed of operation than is obtainable with prior art single-ended drivers, as faster non-saturating transistors operating at lower currents may be employed, and delays in switching of the drivers are equal in relation to clock pulse timing. A further advantage of this configuration is that the LED drive current is relatively immune to variations between LED diodes and the forward voltage drop of these diodes.

Figure 4:
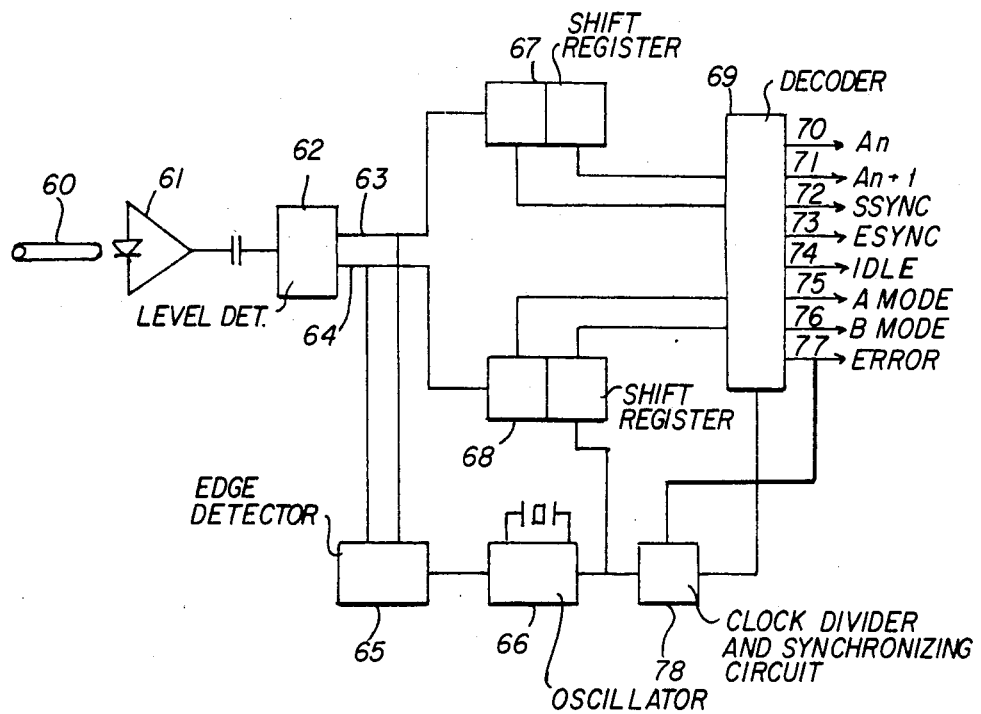
FIG. 4 is a schematic diagram of a data receiver for use in the practice of the invention.

FIG. 4 shows schematically an arrangement of a data receiver for use in the practice of the present invention. The incoming signal on fibre optic cable 60 is recovered by a suitable transducer, such as PIN diode 61 and its associated pre-amplifier, which may be ac coupled to a level detector amplifier 62. The level detector 62 provides a pair of outputs 63 and 64, the first comprising the + and 0 levels of the ternary signal, and the second at 64 comprising the 0 and − levels of the ternary signal.

The output signals of the level detector 62 are applied to an edge detector circuit 65 which is employed to phase lock a crystal oscillator 66 for the regeneration of clock pulses. Alternatively of course, a delay line recovery circuit may be employed for clock pulse generation.

The respective outputs 63 and 64 of the level detector 62 are applied to shift registers 67 and 68, the outputs of which are utilised by the decoder 69, which again may comprise digital multiplexers, in this case combined with other logic elements. At the output of the decoder, signals 70 and 71 representing respectively odd and even data bits will be available, together with SSYNCH and ESYNCH signals 72 and 73, an idle signal 74, signals 75 and 76 representative of the mode of translation, and an error signal 77 which may indicate the existence of bit pair phase error or comparator error. The error signal 77 is fed back to the clock divider and synchronising circuitry 78 which provides the clock signals for the decoder 69, from the bit rate clock pulse supplied by the clock generator 66.

Figure 5:
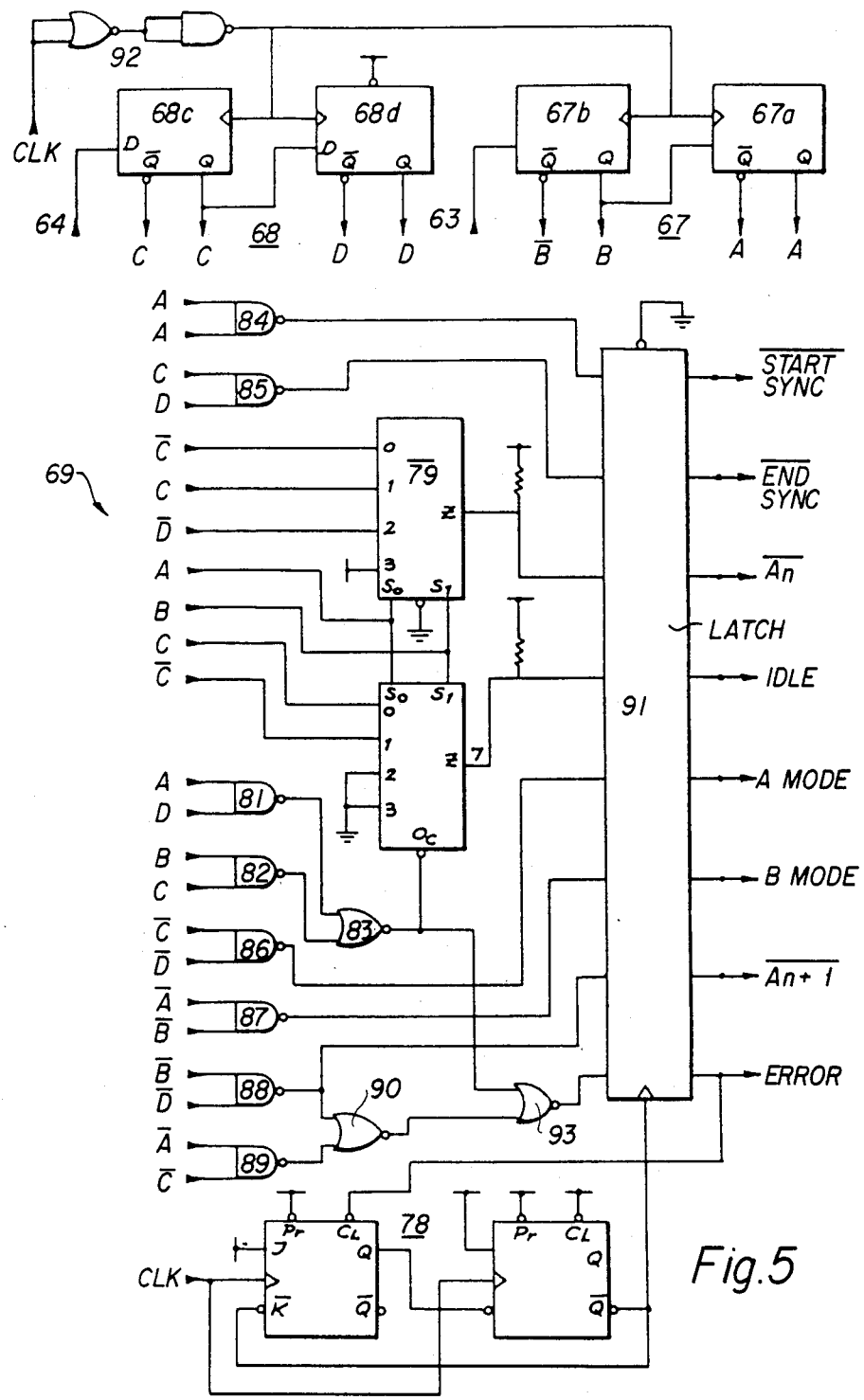
FIG. 5 shows the circuitry of the decoding portion of the receiver of FIG. 4.

More detailed circuitry of the decoder section of the data receiver is shown in FIG. 5.

As shown in FIG. 5, the output 63 from comparator 62, containing 0 and + data is passed to a shift register 67 comprising flip-flops 67a and 67b, and the four outputs of this shift register are identified respectively as A, A, B, B. Similarly, the output 64 of the comparator 62, containing 0 and − data is applied to shift register 68 comprising flip-flops 68c and 68d, the outputs of this shift register being designated C, C, D, D. These shift register outputs are presented in combinations determined by the chosen logic, at the inputs of the decoder 69. The shift registers 67 and 68 are clocked by bit rate clock pulses from the network 92.

The decoder 69 includes two 4-input multiplexers 79 and 80 which receive groupings of shift register outputs, C, C, D, A, B, C, C and a signal derived from A, D, B and C by gates 81, 82 and 83. The remaining logical functions required in the decoder are provided by gates 84 (SSYNCH), 85 (ESYNCH), 86 (A mode), 87 (B mode), 88 ($A_{n+1}$) and 89 with 88 and 90 (phase or comparator error).

Each of these output signals is applied to an octal latch 91 to provide the outputs already identified.

In the interests of brevity, no attempt is made here to detail by means of truth tables or Karnaugh maps the logical functions carried out by the decoder, as these will be readily derived by those skilled in the art, and flow naturally from the system logic already described.

The system therefore provides high speed transmission of synchronous or asynchronous parallel binary data in a completely transparent link. These characteristics enable the construction of links which may operate to expand the possibilities of the various devices which interact in data processing.

The use of links according to the invention makes possible the addition of peripheral devices without intervening serial data transmission protocol transactions, and slow bit and byte synch. acquisition.

The remote high speed data transfer provided by the invention not only allows non-intelligent remote devices to apear as part of the computer's memory space, but also allows add-on memory and other expansion products, and devices such as arithmetic units, convolution units and array processors to appear as memory locations. Links according to the present invention can thus be used as extenders of a computer input-output and address buses, and can provide direct access between the memory spaces of computers in a multiple computer network.

The transmission system of the present invention may be incorporated into the integrated circutry of a single chip computer to reduce the input/output pin count, or to enable additional facilities to be provided, without increasing pin count.

Figure 6:
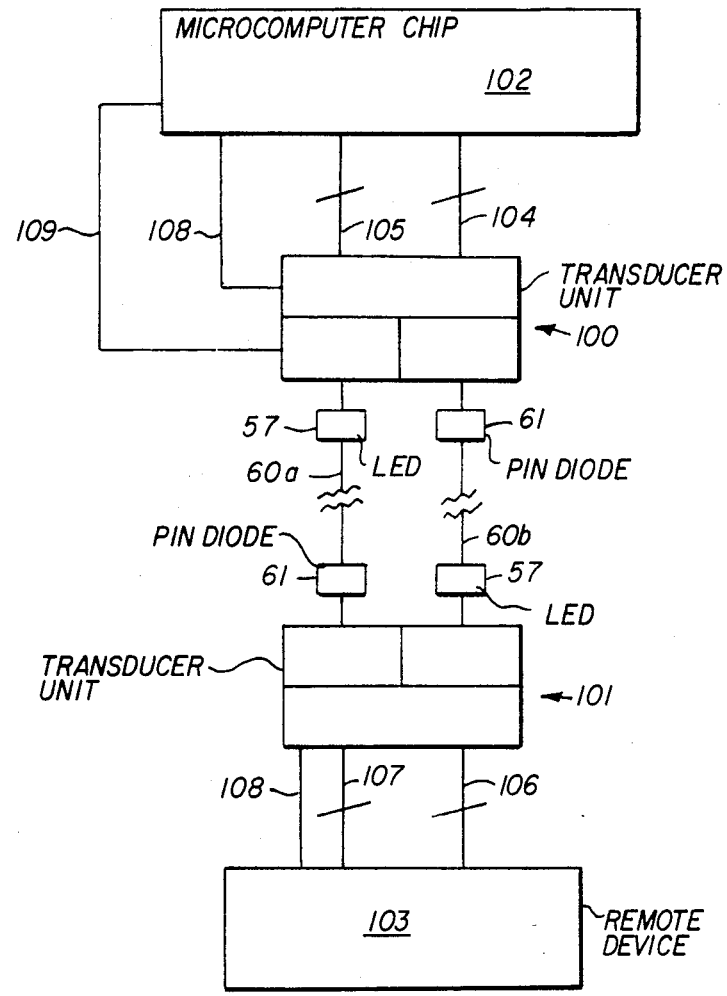
FIG. 6 illustrates the application of the invention to bus extension in microcomputers.

Of particular interest is the application of the present invention to bus extensions in micro computers, where the system protocol enables geat flexibility and simplicity. FIG. 6 illustrates schematically such an application, where two transducer units 100 and 101 enable direct communication between a microcomputer chip 102 and one or more remote devices 103, by means of optical fibre links 60a and 60b.

Each transducer 100 and 101 comprises a transmitter and receiver of the type described above and a multiplexer, the latter being connected with the standard data and address buses 104 and 105 of the microcomputer 102 and the data and address buses 106 and 107 of the remote device 103. Connection of the multiplexers is completed by a read/write signal line 108, and a "wait" signal line 109 between the micro computer and its associated transducer.

In the realisation of such bus extender arrangements, the transmission protocol of the present invention has great advantages when combined with "state machine" implemented control of data flow. Such state machines may comprise a ROM and latch arranged so that the data provided by each successive state is used as the address for the next state, with states imposed by external data re-mapping the address normally generated by the data state.

Figure 7:
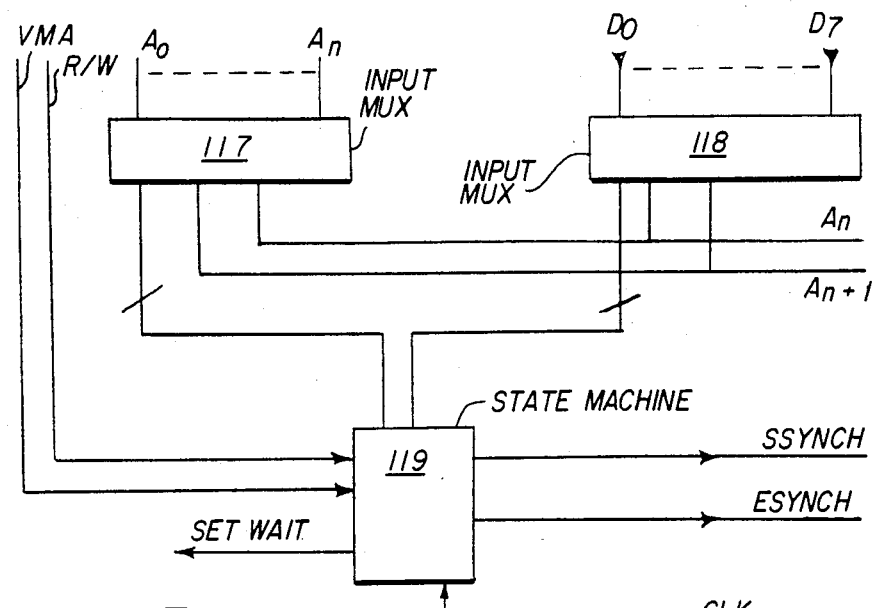
FIG. 7 is a schematical diagram of circuitry for a computer bus extender transmitter.

FIG. 7 shows the computer bus interfacing for a bus extender transmitter incorporating a state machine in the practice of the present invention, for the case of a sixteen bit address and eight bit data configuration. A $2 \times 8$ input multiplexer 117 and a $2 \times 4$ input multiplexer 118 respectively connect with the computer address and data buses to provide the $A_n$ and $A_{n+1}$ signals under the control of a state machine 119. The state machine responds to read/write (R/W) and valid memory address (VMA) signals on the computer bus and provides the signals SSYNCH and ESYNCH, together with a signal SET WAIT for the bus extender receiver circuitry described below. Clock pulses at half bit rate are supplied to the state machine latch from the transmitter clock generator.

Figure 8:
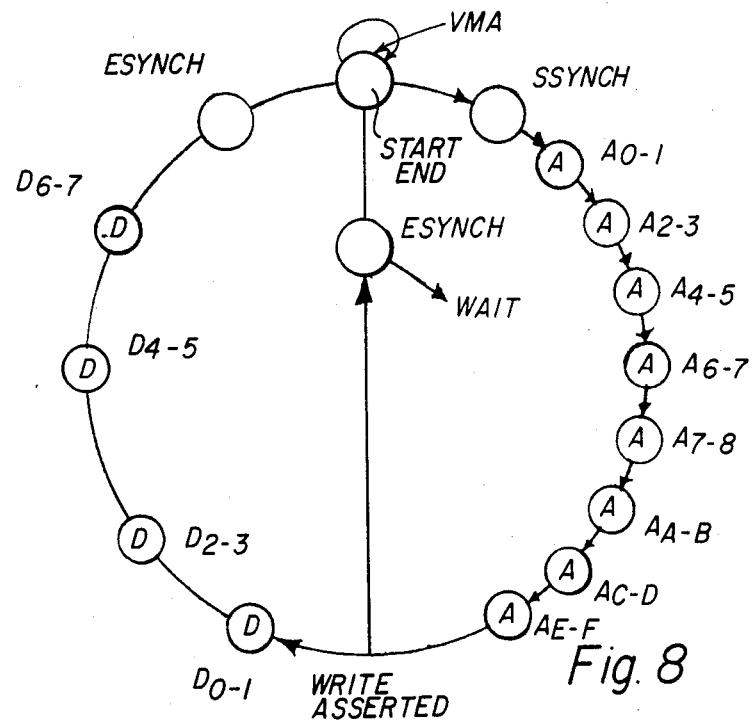
FIG. 8 is a state diagram showing the operation of a state machine used in the circuit of FIG. 7.

The cyclic functioning of the state machine 119 is shown in the state diagram of FIG. 8. On receipt of the signal VMA the state machine emits SSYNCH, and multiplexes out data pairs $A_{0-1}$, $A_{2-3}$ etc. of the address.

The machine then checks for a read or write signal from the computer bus. If the R/W is READ, the state machine emits ESYNCH together with a SET WAIT pulse to trigger the receiver in readiness for data as described below. If the R/W signal is WRITE, the state machine multiplexes out data then emits ESYNCH only.

After either of these operations the machine returns to wait for the next cycle.

Figure 9:
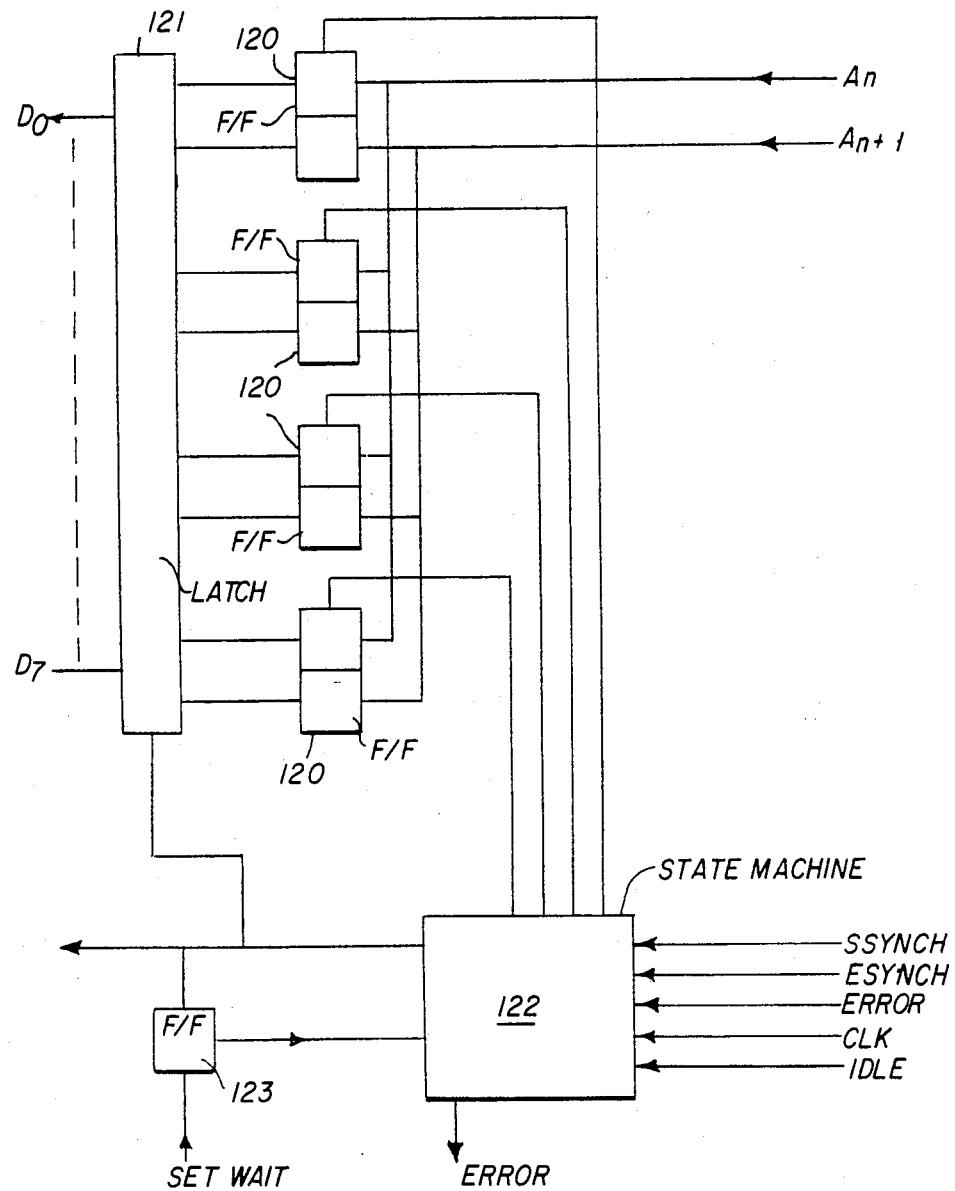
FIG. 9 is a schematic diagram of circuitry for a bus extender receiver.

In FIG. 9, the associated bus extender receiver circuitry is illustrated. Signals $A_n$ and $A_{n+1}$ from the data receiver decoder are presented as parallel data to flip-flops 120 and latch 121 under the control of a state machine 122.

The state machine 122 receives the signals SSYNCH, ESYNCH, IDLE and ERROR from the receiver decoder, together with the regenerated clock signal. The SET WAIT pulse from state machine 119 sets a flip-flop 123 to initiate operation of the machine 122. This flip-flop 123 is re-set by a PROCESSOR WAIT signal generated by state machine 122 when its operation is initiated, that signal remaining untl the end of a cycle of operation of the state machine 122.

Figure 10:
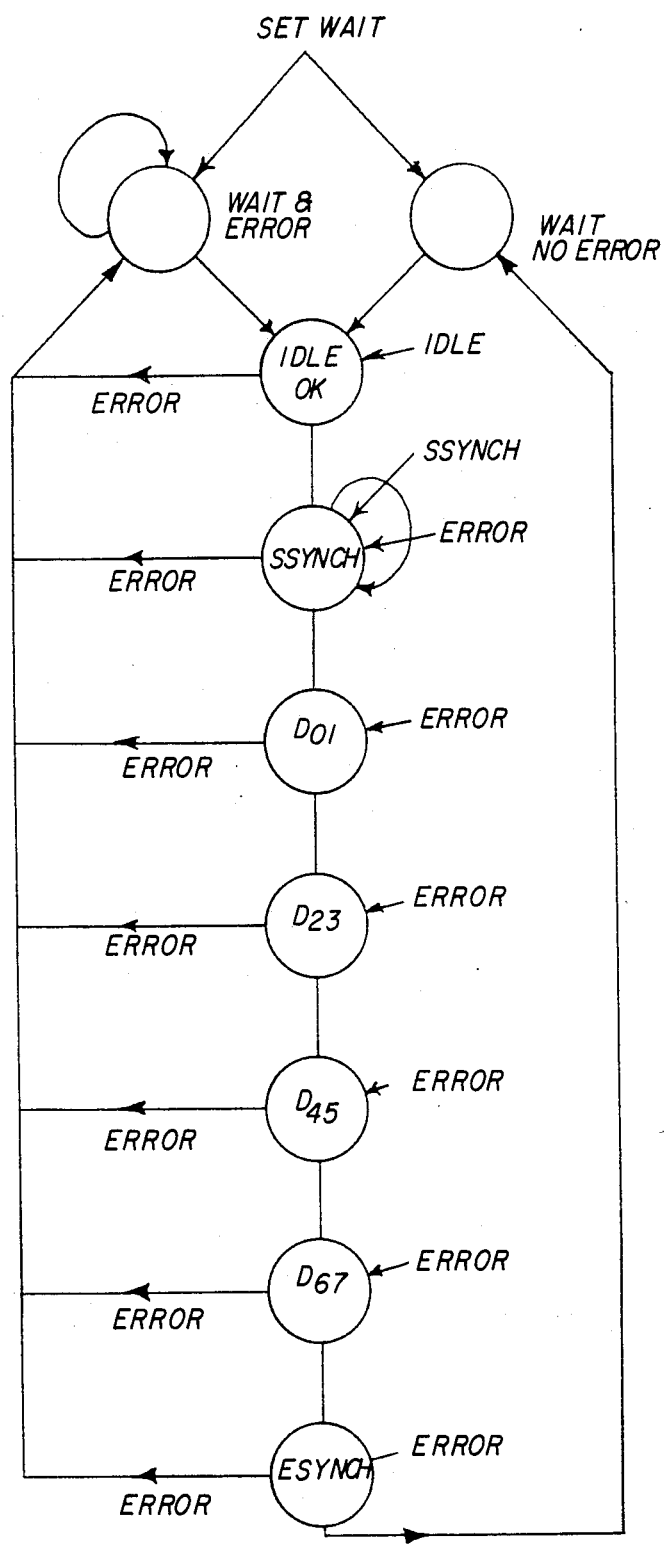
FIG. 10 is a state diagram showing the operation of a state machine used in the circuit of FIG. 9.

The state diagram of FIG. 10 demonstrates the operation of state machine 122. Upon initiation by the SET WAIT signal supplied by state machine 119 in a read cycle, the first check is for the presence of an idle signal, and the machine then moves to await SSYNCH. Upon detecting SSYNCH, the machine proceeds to strobe in successive data pairs $D_{01}$, $D_{23}$ etc. until the cycle is completed by detection of the signal ESYNCH. If an error is indicated by the detection at any time of the ERROR signal, or if no IDLE, SSYNCH or ESYNCH is detected at the appropriate time, the machine returns to its initial state to await re-initiation and asserts an ERROR output.

Figure 11:
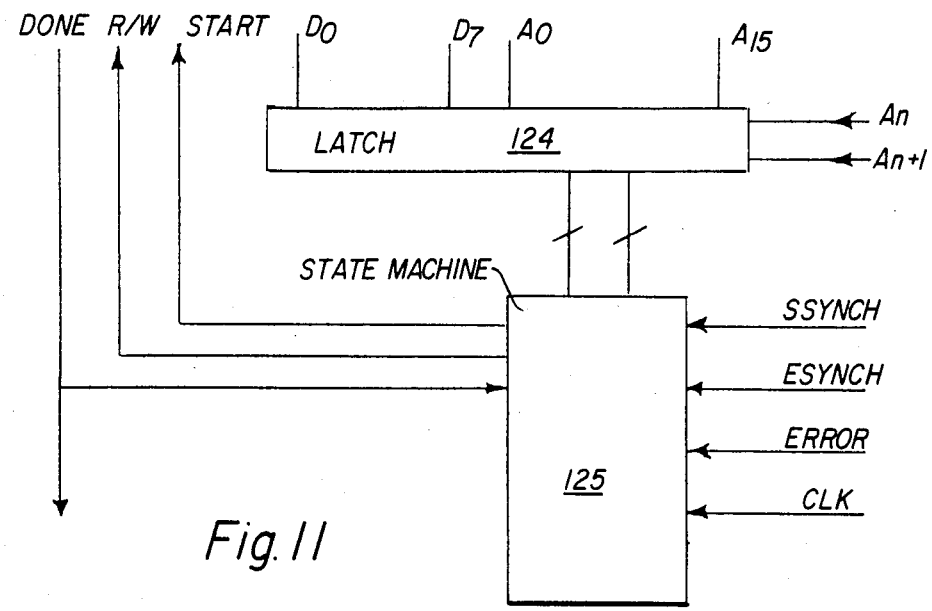
FIG. 11 is a schematic diagram of circuitry for a bus extender receiver.

At the remote end of the bus extension, state machines may similarly be combined to great advantage in conjunction with the subject transmission protocol. FIG. 11 shows schematically the circuitry interfacing a data receiver with a remote device, again for the format of sixteen bit address and eight bit data. The data signals $A_n$ and $A_{n+1}$ from the receiver decoder are supplied to a dual twelve bit addressable latch 124, comprising a pair of eight bit addressable latches and a pair of four bit addressable latches, these latch pairs respectively presenting address and data bits when strobed by a state machine 125.

The state machine 125 presents R/W and initiate (START) signals to the remote device, and responds to a DONE signal from that device. The machine also receives the signals SSYNCH, ESYNCH, ERROR and clock signals from the receiver decoder.

Figure 12:
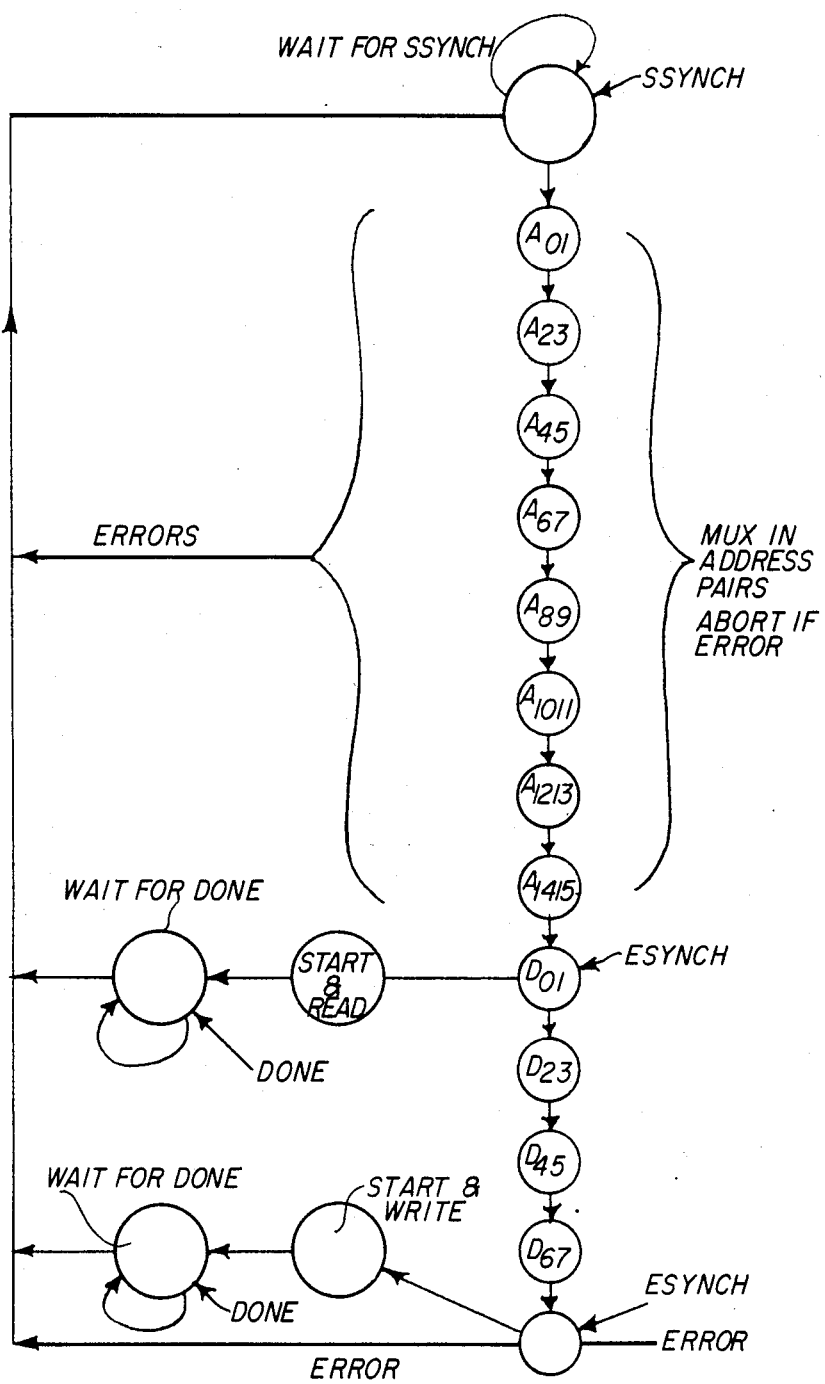
FIG. 12 is a state diagram showing the operation of a state machine used in the circuit of FIG. 11.

As shown in the state diagram of FIG. 12, the state machine will loop until reception of SSYNCH, whereupon it will proceed to multiplex in address pairs $A_{01}$, $A_{23}$, etc. If the address pairs are concluded by the signal ESYNCH, this is interpreted as a READ instruction and READ and START are asserted to the remote device. The machine will then loop awaiting a DONE signal from the device, and then return to await the next SSYNCH.

If data continues without ESYNCH after address bits, then the state machine 125 will continue its cycle, strobing data pairs $D_{01}$, $D_{23}$ etc. At ESYNCH, START and WRITE will be asserted, the DONE signal awaited, and the machine will then return to await SSYNCH. As before, detection of ERROR at any stage will abort the cycle.

Figure 13:
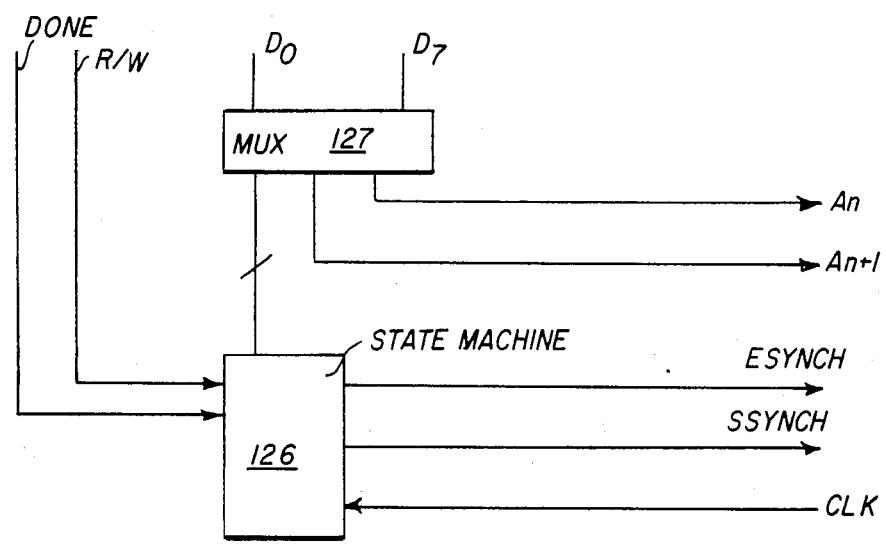
FIG. 13 is a schematic diagram of circuitry for a bus extender transmitter.
Figure 14:
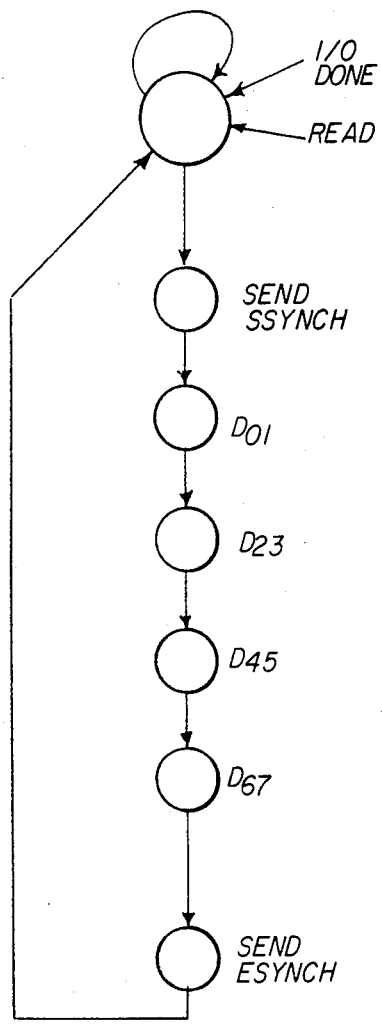
FIG. 14 is a state diagram showing the operation of a state machine used in the circuit of FIG. 13.

Finally, with reference to FIGS. 13 and 14, operation of the remote end interfacing circuitry will be described. Here a state machine 126 receives clock pulses from the remote end transmitter and R/W and DONE signals from the remote device bus, and controls a dual one-of-four multiplexer 127 to provide the signals $A_n$ and $A_{n+1}$ to the transmitter encoder.

Upon detecting an input/output DONE and READ signal from the remote device, the state machine generates SSYNCH and sends the successive data pairs $D_{01}$, $D_{23}$ etc., ending with ESYNCH before returning to await further initiation.

It will be appreciated that an arrangement such as that described offers great flexibility in design and application, as the protocols are adaptable to remote devices of a great many types. With the transmission speeds of which the system is capable, remote devices can be addressed by a computer as part of its own memory space, a feature of particular advantage where such devices may require location in hazardous locations. For example, computer peripheral devices in weapons or in industrial applications such as process control, may communicate with a remote computer not only with minimal complexity and without loss of computing power, but also with the ability to request interrupts, and to request direct memory access at high speeds, with all functions operating in an interleaved manner.

Figure 15:
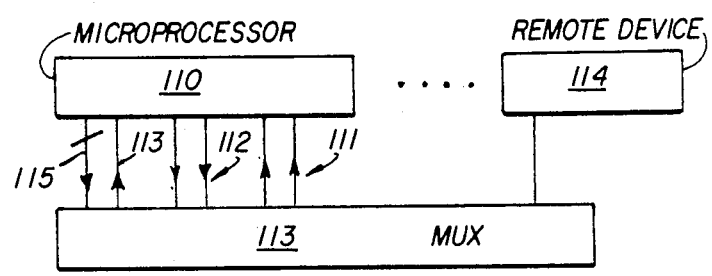
FIG. 15 illustrates the application of the invention to a multiprocessing system.

FIG. 15 illustrates schematically the application of the invention to a multiprocessing system in which the transmission system is incorporated within a microprocessor chip and is employed in combination with external data path multiplexing logic.

The microprocessor 110 is provided with inputs and outputs 111 and 112 connected directly to the multiplexer 113 which passes the ternary encoded signals, using FET transistors, to a plurality of additional processors, memory devices, peripheral devices or fibre optic links 114. The paths to and from the multiplexer 113 may include a mix of direct and fibre optic links.

The destination processor is selected by "path select" lines 115, preferably in association with a memory mapping or management system within the processor, while a "path busy" line 116 signals that the selected path is available for the required data transaction. During a data transaction, the microprocessor 110 and the description microprocessor or other unit will be busy, and a microprocessor may select itself as the description, making it busy to all requests.

It will be appreciated that while the present invention has been developed to take advantage of fibre optic links, other link types (for example transformer coupled co-axial cable and optically isolated current links) may be employed over short distances.

Other applications of the transmission system of the present invention will be apparent to the skilled reader. For example, the system may be incorporated in micro computers to enable a micro computer to address all its peripherals and memory via the system, enabling the micro computer to be housed in a smaller package with as few as 16 pins. Once a microprocessor is adapted to interface to the transmission system of the present invention, a variety of microprocessors and standard peripheral devices may interact without any need for the peripheral controller to be constructed for the external data and address bus system of a particular microprocessor, and the invention in this way enables great flexibility to be achieved in the use of various product ranges.

I claim:

1. A method for transmitting binary sequential data by multi-level encoding of grouped selected data bits in which a first number of data bit sequences of said grouped data bits are translated into uniquely chosen ones of a first group of level pairs of a multi-level signal and the remaining data bit sequences of said grouped data bits are translated, in a first mode of translation, into uniquely chosen ones of a second group of level pairs of said signal, and, in a second mode of translation, into uniquely chosen ones of a third group of level pairs of said signal, the mode of translation changing after the occurrence of any of one said remaining data bit sequences, characterized by the steps of:
   (a) transmitting a start synchronizing signal comprising a first pair of levels of said signal not contained in said first, second or third groups;
   (b) transmitting signal level pairs representative of data; and
   (c) transmitting an end synchronizing signal comprising a second pair of levels of said signal not contained in said first, second or third groups.

2. A method according to claim 1 further characterized in that the synchronizing signal pairs are chosen from those which do not involve a change of signal level.

3. A method according to claim 1 further characterized in that a chosen one of said remaining data bit sequence is transmitted continuously during periods where no data is present.

4. A method for transmitting binary sequential data by paired selected ternary encoding in which two of the possible four bit sequences of paired binary data are translated into uniquely chosen ones of two of the six possible successive differing level pairs of a ternary signal and the other two of the possible four bit sequences of the paired data are translated, in a first mode of transulation, into respective uniquely chosen ones of a further two successive differing level pairs of said ternary signal, and, in a second mode of translation, respectively into the remaining two successive differing level pairs of said ternary signal, the mode of translation changing after an occurrence of either of the said other two bit sequences, characterized by the steps of:

(a) transmitting two bits comprising successive identical first levels of said ternary signal;
(b) transmitting said ternary signal representing a unit of data; and
(c) transmitting two bits comprising successive identical second levels of said ternary signal.

5. A method according to claim 4 in which a ternary signal corresponding to one of said other two bit sequences is transmitted during periods where no data is transmitted.

6. Apparatus for transmitting binary sequential data by multi-level encoding of grouped selected data bits, comprising means by which a first number of data bit sequences of said grouped data bits are translated into uniquely chosen ones of a first group of level pairs of a multi-level signal and the remaining data bit sequence of said grouped data bits are translated, in a first mode of translation, into uniquely chosen ones of a second group of level pairs of said signal, and, in a second mode of translation, respectively into uniquely chosen ones of a third group of level pairs of said signal; and means for changing the mode of translation from said first mode to said second mode after the occurrence of any one of said remaining data bit sequences, said apparatus further comprising means by which the transmission of signal level pairs representing data is preceded by the transmission of a start synchronizing signal comprising a first pair of levels of said signal not contained in said first, second or third groups and is followed by an end synchronizing signal comprising a second pair of levels of said signal not contained in said first, second or third groups.

7. Apparatus fpr transmitting binary sequential data according to claim 6, further comprising means for the continuous transmission of a chosen one of said remaining data bit sequences during periods where no data is present.

8. Apparatus for transmitting binary sequential data by paired selected ternary encoding, comprising encoding means for translating two of the possible four bit sequences of paried binary data into uniquely chosen ones of two of six possible successive differing level pairs of a ternary signal and for translating the other two of the possible four bit sequences of the paired data, in a first mode of translation, into respective uniquely chosen ones of a further two successive differing level paris of said ternary signal, and, in a second mode of translation, respectively into the remaining two successive differing level pairs of said ternary signal, and means for providing an input to said encoding means after an occurrence of either of said other two bit sequences for changing the mode of translation of said encoding means, said apparatus further comprising means by which the transmission of said ternary signal representing a unit of data is preceded by the transmission of two bits comprising successive identical first levels of said ternary signal and followed by the transmission of two bits comprising successive identical second levels of said ternary signal.

9. Apparatus for transmitting binary sequential data according to claim 8, further comprising means for transmitting, during periods when no data is transmitted, a ternary signal corresponding to one of said other two bit sequences.

10. Apparatus according to claim 8 or claim 9 further characterized in that said encoding means comprises digital multiplexer means for encoding said binary data to provide a first driving signal and a second driving signal; output means capable of occupying one of three states each corresponding to a level of said ternary signal, the state of said output means being controlled by a first output driving circuit and a second output driving circuit, said first driving signal being applied to said first output driving circuit and said second driving signal being applied to said second output driving circuit.

11. Apparatus according to claim 10 further characterized in that said output means is driven to a first state when each of said driving signals is in a first state and to a second state when each of said driving signals is in a second state and to a third state when one of said driving signals is in its first state and the other is in its second state.

12. Apparatus according to claim 11 wherein said output means comprises a pair of semiconductor devices the respective states of which are controlled in response to said driving signals.

13. Apparatus according to claim 12 wherein said output means comprises a load impedance common to said semiconductor devices.

14. Apparatus according to claim 13 wherein each said semiconductor device is a transistor being one of a pair of differentially connected transistors, the conductive states of each said pair being controlled by flip-flops actuated by said first and second driving signals, respectively.

15. Apparatus according to claim 10 further characterized in that said encoding means comprises register means providing two signals respectively containing alternate data bits of said binary data, said two signals being applied to said digital multiplexer means.

16. Apparatus according to claim 10 further characterized in that said first and second driving circuits comprise start synchronizing means responsive to a signal indicating a commencement of data transmission to cause said output means to occupy its state corresponding to said first level of said ternary signal, and end synchronizing means responsive to a signal indicating the end of data transmission to cause said output means to occupy its state corresponding to said second level of said ternary signal.

17. Apparatus according to claim 14 wherein said first and second driving circuits further comprise a flip-flop arranged to over-ride the operation of said flip-flops actuated by said first and second driving signals in response to a signal indicating the commencement of data transmission to cause said output means to occupy its state corresponding to said first level of said ternary signal, and a flip-flop arranged to over-ride the operation of said flip-flops actuated by said first and second driving signals in response to a signal indicating the end of data transmission to cause said output means to occupy its state corresponding to said second level of said ternary signal.

18. Apparatus according to claim 10 further characterized in that said means for changing the mode of translation comprises gate means detecting the occurrence of either of said other two bit sequences, and means actuated by said gate to alter the logical state of selected controlling inputs of said digital multiplexer means.

19. Apparatus for receiving a multi-level signal of the type produced by the method of claim 1 or the apparatus of claim 6, comprising means for detecting said start synchronizing signal; means for decoding said signal level pairs representing data bits in said signal; and means for detecting said end synchronizing signal.

20. Apparatus according to claim 19 comprising a clock signal generator synchronized by means responsive to changes in the level of said ternary signal.

21. Apparatus for processing a ternary data signal of the type produced by apparatus according to claim 20 comprising means detecting a repetition of said one of said other two bit sequences and means generating an idle signal upon the detection of said repetition.

22. Apparatus for processing a ternary data signal of the type produced by the apparatus of claim 8, comprising means deriving from said ternary data signal a first signal representative of first and second levels of said ternary signal and a second signal representative of said second and third levels of said ternary signal, said first signal being applied to first shift register means, said second signal being applied to second shift register means, the outputs of said first and second shift register means being applied to decoding means.

23. Apparatus for processing a ternary data signal according to claim 20 wherein said decoding means includes digital multiplexing means.

24. A method for transmitting binary sequential data by paired selected ternary encoding in which two of the possible four bit sequences of paired binary data are translated respectively into first and second level pairs of a ternary signal and the other two of the possible bit sequence of the paired data are translated, in a first mode of translation, respectively into third and fourth level pairs of said ternary signal and in a second mode of translation, respectively into fifth and sixth level pairs of said ternary signal, characterized by the steps of:
(a) transmitting two bits comprising a seventh level pair of said ternary signal;
(b) transmitting said ternary signal representing a unit of data after said seventh level pair; and
(c) transmitting two bits comprising an eighth level pair of said ternary signal of following the transmission of said ternary signal.

25. Apparatus for transmiting binary sequential data by paired selected ternary encoding, comprising means for translating two of four possible bit sequences of paired binary data into first and second level pairs, respectively, of a ternary signal and for translating the other two of the possible bit sequences of the paired data, in a first mode of translation, respectively into third and fourth level pairs of said ternary signal and in a second mode of translation, respectively into fifth and sixth level pairs of said ternary signal, and means changing the mode of translation after an occurrence of either of the said other two bit sequences, characterized in that said apparatus further comprises means by which the ternary signal representing a unit of data is preceded by the transmission of two bits comprising a seventh level pair of said ternary signal and followed by the transmission of two bits comprising an eighth level pair of said ternary signal.

* * * * *